United States Patent
Shimizu et al.

(10) Patent No.: US 8,071,502 B2
(45) Date of Patent: Dec. 6, 2011

(54) EXHAUST GAS PURIFYING CATALYST

(75) Inventors: Masanori Shimizu, Kakegawa (JP); Michio Tanaka, Kakegawa (JP)

(73) Assignee: Cataler Corporation, Shizuoka-Ken (JP)

(*) Notice: Subject to any disclaimer, the term of this patent is extended or adjusted under 35 U.S.C. 154(b) by 364 days.

(21) Appl. No.: 11/438,869

(22) Filed: May 23, 2006

(65) Prior Publication Data

US 2006/0270550 A1    Nov. 30, 2006

(30) Foreign Application Priority Data

May 24, 2005 (JP) ................................. 2005-151047

(51) Int. Cl.
 B01J 23/00 (2006.01)
 B01J 23/10 (2006.01)
 B01J 23/42 (2006.01)
(52) U.S. Cl. .................. 502/325; 502/303; 502/339
(58) Field of Classification Search .............. 502/66, 502/304, 339, 303, 325; B01J 29/06, 23/00, B01J 23/10, 23/40, 23/42
See application file for complete search history.

(56) References Cited

U.S. PATENT DOCUMENTS

| | | | |
|---|---|---|---|
| 5,177,041 A * | 1/1993 | Horiuchi et al. | 502/66 |
| 6,143,691 A * | 11/2000 | Shiraishi et al. | 502/304 |
| 7,473,665 B2 | 1/2009 | Kawai et al. | |
| 7,585,478 B2 | 9/2009 | Shirahata et al. | |
| 2001/0031699 A1* | 10/2001 | Matsumoto et al. | 502/303 |
| 2003/0148875 A1* | 8/2003 | Kasahara et al. | 502/65 |
| 2005/0020443 A1* | 1/2005 | Wei et al. | 502/325 |
| 2005/0031501 A1* | 2/2005 | Kawai et al. | 422/180 |
| 2005/0201906 A1* | 9/2005 | Alvin et al. | 422/177 |

FOREIGN PATENT DOCUMENTS

| | | | |
|---|---|---|---|
| EP | 1342499 A * | 9/2003 | |
| JP | 62125856 A | 9/1987 | |
| JP | 3196841 | 8/1991 | |
| JP | 5023593 | 2/1993 | |
| JP | 6226053 A | 8/1994 | |
| JP | 2001205051 A * | 7/2001 | |
| JP | 2001259424 | 9/2001 | |
| JP | 2003305342 A | 10/2003 | |
| JP | 2004008977 A | 1/2004 | |
| JP | 2004-283692 | 10/2004 | |
| JP | 2005-211794 | 8/2005 | |

OTHER PUBLICATIONS

Notice of Reason(s) for Rejection, Mailing Date: Aug. 17, 2010, Patent Application No. 2005-151047. pp. 2.
Translation of Notice of Reason(s) for Rejection, Mailing Date: Aug. 17, 2010, Patent Application No. 2005-151047. pp. 2.

* cited by examiner

Primary Examiner — Jerry Lorengo
Assistant Examiner — Carlos Barcena
(74) Attorney, Agent, or Firm — Davis & Bujold, P.L.L.C.

(57) ABSTRACT

An exhaust gas purifying catalyst is provided in which alloying of precious metals is prevented even at high temperatures so that degradation of catalyst can be inhibited. The exhaust gas purifying catalyst comprises a substrate serving as a passage of exhaust gas; and a catalyst coating layer formed on the internal surface of the through hole and including precious metals and a refractory inorganic oxide. The catalyst coating layer formed in the area A located on the upstream portion of the passage with respect to the flow direction of exhaust gas contains a precious metal, Rh. The weight ratio of Rh and the precious metal other than Rh is 1:0 to 0.5. The catalyst coating layer formed in the area B located on the downstream portion of the passage contains precious metal other than Rh. The weight of the precious metal other than Rh is larger than the weight of Rh.

3 Claims, 6 Drawing Sheets

EXHAUST GAS PURIFYING CATALYST

BACKGROUND OF THE INVENTION (i) Field of the Invention

The present invention relates to an exhaust gas purifying catalyst that removes toxic substances contained in exhaust gas from an internal combustion engine of an automobile, a motorcycle, and others.

(ii) Background Art

A variety of catalysts for purifying exhaust gas emitted from an internal combustion engine of an automobile and the like have been provided. These days, most of the catalysts are three-way catalysts that purify HC, CO, and NOx at the same time. Such catalysts are disclosed, for example, in Publication of Unexamined Japanese Patent Application No. Hei 3-196841, Publication of Unexamined Japanese Patent Application No. Hei 5-23593 and Publication of Unexamined Japanese Patent Application No. 2001-259424.

In one example of the three-way catalyst, one of or a combination of catalytic components, such as Pt, Pd and Rh, is dispersed in and carried by a refractory inorganic compound powder, such as alumina and ceria-zirconia, to form a catalytic composition. Then the catalytic composition is applied to cover a honeycomb substrate made of cordurite, metal and the like.

In another example of the three-way catalyst, a honeycomb substrate made of cordurite, metal and the like is covered with a refractory inorganic oxide, such as alumina and ceria-zirconia, and is soaked in a slurry containing one of or a combination of catalytic components, such as Pt, Pd and Rh, so as to carry the catalytic components.

SUMMARY OF THE INVENTION

Due to the recent tightening of regulations on exhaust gas, catalysts are required to further reduce HC, CO, and NOx in exhaust gas. Accordingly, there is a tendency to provide a catalyst close to an engine so that the catalyst can be activated at an early stage.

However, since the temperature of the catalyst is increased near the engine, there is a problem in that alloying occurs of different precious metals contained in the catalyst, thus causing the catalyst activity to deteriorate. To solve this problem, measures, such as separate carrying of the precious metals, have been taken against the degradation by alloying of the precious metals. Nevertheless, since precious metals migrate and agglomerate at high temperatures, not much effect has been achieved.

The present invention, which has been made in view of the above circumstances, has an object to provide an exhaust gas purifying catalyst in which alloying of precious metals contained therein is avoided even at high temperatures so that degradation of the catalyst can be inhibited.

To attain the above object, one aspect of the invention provides an exhaust gas purifying catalyst which includes a substrate having a through hole penetrating the substrate in an axial direction and a catalyst coating layer formed on an internal surface of the through hole. The catalyst coating layer contains a component (a): Rh, a component (b): Pt and/or Pd, and a component (c): a refractory inorganic oxide. The through hole forms a passage for exhaust gas. A weight ratio of the component (a) to the component (b) in the catalyst coating layer is within a range of 1:0 to 1:1 in an area A located on an upstream portion of the passage with respect to a flow direction of exhaust gas. A weight of the component (b) in the catalyst coating layer is larger than a weight of the component (a) in an area B located on a downstream portion of the passage with respect to the flow direction of exhaust gas.

In another aspect of the present invention, there is provided an exhaust gas purifying catalyst which includes a substrate having a through hole penetrating the substrate in an axial direction and a catalyst coating layer formed on an internal surface of the through hole. The catalyst coating layer contains a component (a): Rh, a component (b): Pt and/or Pd, and a component (c): a refractory inorganic oxide. The through hole forms a passage for exhaust gas. A weight ratio of the component (a) to the component (b) in the catalyst coating layer is within a range of 1:0 to 1:1 in an area A located on an upstream portion of the passage with respect to a flow direction of exhaust gas. A volume of a portion of the passage corresponding to the area A is within a range of 60 to 94 vol % of a volume of the whole passage.

In the present invention, the catalyst coating layer formed in the area A may include only a single precious metal, e.g., Rh. Alternatively, the catalyst coating layer formed in the area A may include Rh and the other precious metal(s) (such as Pt, Pd, or both) in such a manner that the weight ratio of the precious metal(s) other than Rh to the weight of Rh is equal to 1 and below (preferably not more than 0.5). By setting the ratio of the precious metals contained in the catalyst coating layer formed in the area A as above, alloying of Rh and the other precious metal(s) in the area A does not occur even if the temperature of the exhaust gas purifying catalyst is increased. Accordingly, the activity of Rh contained in the area A does not deteriorate at high temperatures, and high NOx purifying ability can be achieved.

Additionally, the area A is located on the upstream portion of the passage with respect to the flow direction of exhaust gas. Therefore, no precious metal (e.g., Pt and/or Pd) which may possibly be alloyed with Rh is drifted from further upstream. As a result, alloying of Rh and other precious metals in the area A is further difficult. Even at high temperatures, the activity of Rh contained in the area A is not likely to decrease.

According to the former aspect of the present invention, the weight of the precious metal(s) other than Rh (i.e., Pt, Pd, or both) is larger than the weight of Rh in the catalyst coating layer formed in the area B. Therefore, purifying performance by the precious metal(s) other than Rh can be sufficiently enhanced. For example, Pt and Pd can remove CO and HC.

According to the latter aspect of the present invention, the volume of the portion of the passage corresponding to the area A is within a range of 60 to 94 vol % (more preferably, 65 to 94 vol %) of the volume of the entire passage. As the volume of the portion corresponding to the area A is not more than 94 vol %, at least 6 vol % of the area located on the downstream of the area A (referred to as an area B hereafter) can be secured. Since the density of precious metal(s) (such as Pt, Pd or both) existing in the area B does not increase too much, particle growth of the precious metals can be avoided. In addition, as the volume of the portion corresponding to the area A is not less than 60 vol %, the amount of Rh existing in the area A can be increased. Accordingly, it is possible to enhance the NOx purifying activity in the area A. Moreover, the area A can be broadened so that the alloying of Rh and the other precious metal(s) (such as Pt, Pd or both) in the area A is further difficult.

The exhaust gas purifying catalyst according to the latter aspect of the present invention may be provided with an area B located on a downstream portion of the passage with respect to the flow direction of exhaust gas. The weight of the component (b) in the catalyst coating layer is larger than the weight of the component (a). Then, the same effect as mentioned for the former aspect of the present invention can be also achieved in the latter aspect of the present invention.

In both aspects of the invention, examples of the refractory inorganic oxide are alumina (especially activated alumina), Zr oxide, Ce oxide, ZrCe compound oxide, silica and titania. A preferable amount of the refractory inorganic oxide is within a range of 100 to 300 g per liter of the catalyst.

There is no particular limitation to the above-mentioned substrate as long as the substrate is usually used for an exhaust gas purifying catalyst. For example, a honeycomb substrate, a corrugated substrate, a monolith honeycomb substrate may be employed. The substrate may be made of any refractory material. For example, an integrally structured substrate made of refractory ceramic, such as cordierite, or of metal, such as ferrite stainless steel, may be employed.

The catalyst coating layer formed in the area A and the catalyst coating layer formed in the area B preferably contain barium element and lanthanum element. A preferable amount of barium element and lanthanum element is within a range of 0 to 30 g per liter of the catalyst.

According to the exhaust gas purifying catalysts in the present invention, a passage of exhaust gas can be formed by the through hole provided in a single substrate. In this case, for example, the area A and the area B are formed in the through hole provided in the single substrate. The area A, which is required to be located upstream from the area B, is preferably an area including an end as an exhaust gas entrance in the through hole. The area B, which is required to be located downstream from the area A, is preferably an area including an end as an exhaust gas exit in the through hole. The through hole may consist only of the area A and the area B, but may also include an area other than the area A and the area B, for example, on an upstream side of the area A, between the area A and the area B, or on a downstream side of the area B.

Further, the exhaust gas purifying catalysts in the present invention may be provided with two or more substrates such that the passage of exhaust gas may be formed by combining through holes respectively provided in the substrates. In this case, it may be possible to form the area A in the through hole of one substrate and form the area B in the through hole of another substrate. Then, the substrate with the area A is arranged on an upstream side in an exhaust gas flow direction, while the substrate with the area B is arranged on a downstream side in the exhaust gas flow direction.

BRIEF DESCRIPTION OF THE DRAWINGS

Preferred embodiments of the present invention will be described hereinafter with reference to the drawings, in which.

DETAILED DESCRIPTION OF THE PREFERRED EMBODIMENTS

Embodiment 1

Figure 1:
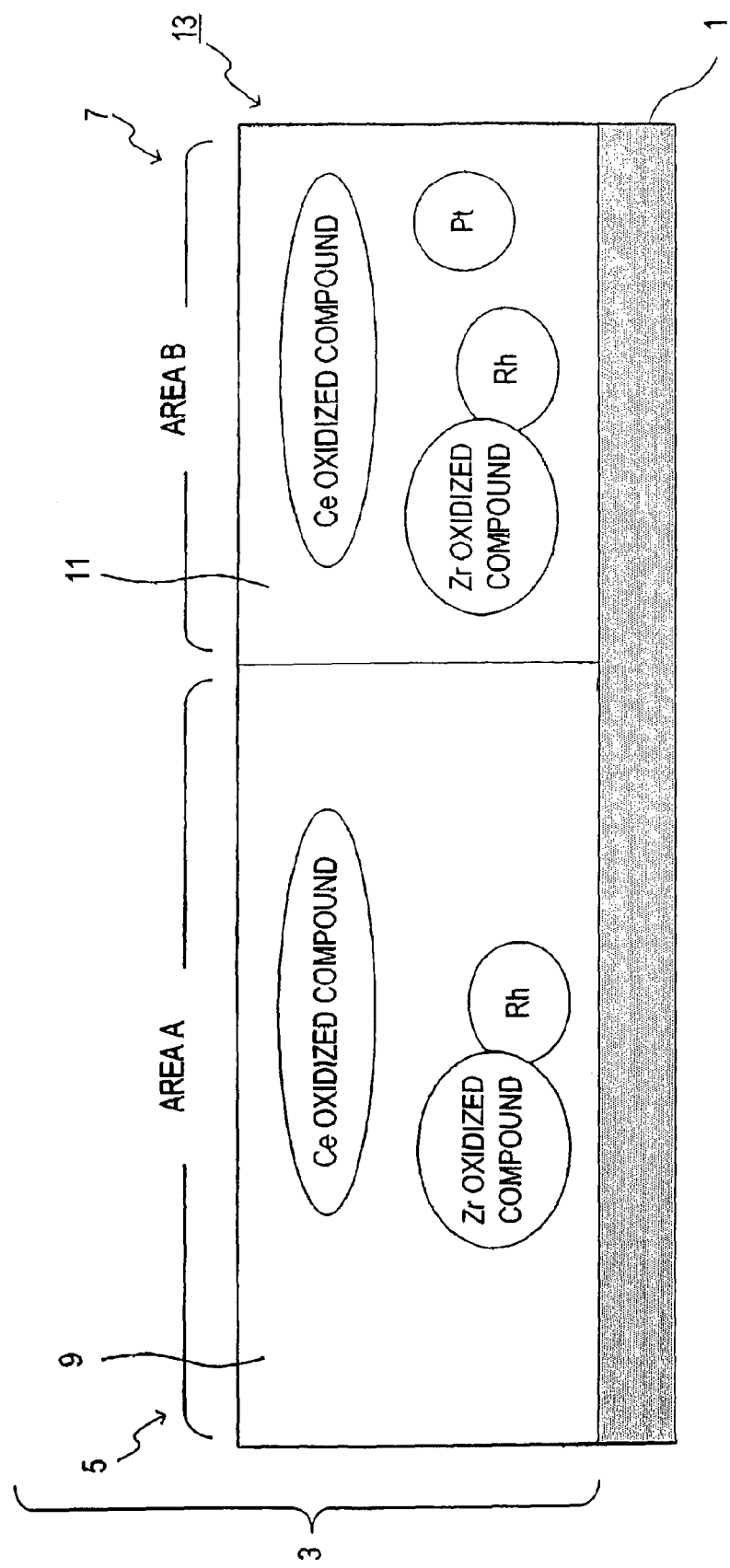
FIG. 1 is an explanatory diagram showing a structure of an exhaust gas purifying catalyst 13.

A honeycomb substrate made of cordurite is employed as a substrate 1. As shown in FIG. 1, the substrate 1, includes a through hole 3 extending in an axial direction and having a constant cross-sectional area. The entire length of the through hole 3 is 100 mm. In FIG. 1, a left end of the through hole 3 is an entrance end 5 and a right end of the through hole 3 is an exit end 7.

Exhaust gas enters the through hole 3 from the entrance end 5, passes through the through hole 3, and exits from the exit end Accordingly, the though hole 3 shown in FIG. 1 constitutes a passage of exhaust gas, in which the flow direction of exhaust gas is in a left to right direction. Although only one through hole 3 is indicated in FIG. 1, there actually are multiple of through holes 3 formed in parallel with one another. The entire volume of the through holes 3 is one liter.

First, below listed components are mixed, dried at 250° C. for an hour, and calcined at 500° C. for an hour to prepare a powder H1.

(Powder H1)
Rh nitrate solution: an amount containing 0.2 g of Rh
$ZrO_2$ oxide: 50 g
water: an appropriate amount
Then, below listed components are mixed to prepare a slurry S1.

(Slurry S1)
the powder H1: 50 g
alumina: 70 g
cerium oxide: 70 g
alumina sol: 200 g
water: 50 g The slurry S1 is applied to coat the internal surface of the through hole 3 of the substrate 1 shown in FIG. 1 from the entrance end 5 to the exit end 7, and dried. After dried at 250° C. for an hour, calcination is performed at 500° C. for an hour.

A Pt ammine solution (an amount containing 1.0 g of Pt) is used as a slurry S2. As shown in FIG. 1, the slurry S2 is applied to coat the internal surface of the through hole 3 of the substrate 1 over a prescribed range from the exit end 7 (hereinafter, referred to as an area B) to complete an exhaust gas purifying catalyst 13. The volume of a portion corresponding to the area B of the through hole 3 is set to be 30 vol % of the entire volume of the through hole 3.

In the exhaust gas purifying catalyst 13 of Embodiment 1, only the slurry S1 is applied to the internal surface of the portion other than the area B of the through hole 3, i.e., a range from the entrance end 5 to a boundary with the area B (hereinafter, referred to as an area A), to form an upstream side catalyst coating layer 9. In Embodiment 1, the volume of the portion corresponding to the area A of the through hole 3 is 70 vol % of the entire volume of the through hole 3. Also, the slurry S2 is applied to the internal surface of the portion corresponding to the area B of the through hole 3 after the slurry S1 is applied, to form a downstream side catalyst coating layer 11.

The exhaust gas purifying catalyst 13 of Embodiment 1 contains 1.0 g of Pt, 0.2 g of Rh, and 120 g of alumina (including alumina sol) in both upstream side catalyst coating layer 9 and downstream side catalyst coating layer 11. Also, 0.4 mol/L of Ce and 0.4 mol/L of Zr are contained in both upstream side catalyst coating layer 9 and downstream side catalyst coating layer 11.

The upstream side catalyst coating layer 9 includes a single precious metal, Rh (i.e., the weight ratio of Rh to Pt is 1:0). The downstream side catalyst coating layer 11 includes precious metals, Rh and Pt. The weight ratio thereof is 1:16.7.

Embodiment 2

Although an exhaust gas purifying catalyst 13 in Embodiment 2 is produced basically in the same manner as in Embodiment 1, there are some differences. Accordingly, a description will now be made mainly with respect to the differences.

In Embodiment 2, a Pd ammine solution (an amount containing 1.0 g of Pd) is used in place of the slurry S2, as a slurry applied to coat the internal surface of the area B of the through hole 3 of the substrate 1 (hereinafter, referred to as a slurry S3).

In the exhaust gas purifying catalyst 13 of Embodiment 2, only the slurry S1 is applied to coat the internal surface of the through hole 3 in the area A to form the upstream side catalyst coating layer 9. The volume of the portion corresponding to the area A of the through hole 3 is 70 vol % of the entire volume of the through hole 3 in Embodiment 2. The slurry S3 is applied to coat the internal surface of the portion corresponding to the area B of the through hole 3 after the slurry S1 is applied, to form the downstream side catalyst coating layer 11.

The exhaust gas purifying catalyst 13 of Embodiment 2 contains 1.0 g of Pd, 0.2 g of Rh, and 120 g of alumina (including alumina sol) in both upstream side catalyst coating layer 9 and downstream side catalyst coating layer 11. Also, 0.4 mol/L of Ce and 0.4 mol/L of Zr are contained in both upstream side catalyst coating layer 9 and downstream side catalyst coating layer 11.

The upstream side catalyst coating layer 9 includes a single precious metal, Rh (i.e., the weight ratio of Rh to Pt is 1:0). The downstream side catalyst coating layer 11 includes precious metals, Rh and Pt. The weight ratio thereof is 1:16.7.

Embodiment 3

Although an exhaust gas purifying catalyst 13 in Embodiment 3 is produced basically in the same manner as in Embodiment 1, there are some differences. Accordingly, a description will be made below mainly with respect to the differences.

In Embodiment 3, a slurry S4 produced as below is used in place of the slurry S1 as a slurry for coating the internal surface of the entire through hole 3.

The slurry 4 is prepared as below. First, below listed components are mixed, dried at 250° C. for an hour, and calcined at 500° C. for an hour to prepare a powder H2.

(Powder H2)
Pt nitrate solution: an amount containing 0.04 g of Pt
$CeO_2$ oxide: 70 g
water: an appropriate amount Then, below listed components are mixed to prepare the slurry S4.

(Slurry S4)
the powder H1: 50 g
alumina: 70 g
the powder H2: 70 g
alumina sol: 200 g
water: 50 g In the exhaust gas purifying catalyst 13 of Embodiment 3, the upstream side catalyst coating layer 9 is coated by the slurry S4 produced as above. The downstream side catalyst coating layer 11 is coated by a Pt ammine solution (an amount including 0.96 g of Pt) (hereinafter, referred to as a slurry S5), in place of the slurry 2, after coated by the slurry S4.

In the exhaust gas purifying catalyst 13 of Embodiment 3, the upstream side catalyst coating layer 9 includes precious metals, Rh and Pt, and the weight ratio thereof is 1:0.3. The downstream side catalyst coating layer 11 includes precious metals, Rh and Pt, and the weight ratio thereof is 1:16.0.

Embodiment 4

Although an exhaust gas purifying catalyst 13 in Embodiment 4 is produced basically in the same manner as in Embodiment 3, there are some differences. Accordingly, a description will be made below mainly with respect to the differences.

In Embodiment 4, a slurry S6 as produced below is used in place of the slurry S4 as the slurry applied to the internal surface of the entire through hole 3.

The slurry 6 is prepared as below. First, below listed components are mixed, dried at 250° C. for an hour, and calcined at 500° C. for an hour to prepare a powder H3.

(Powder H3)
Pt nitrate solution: an amount containing 0.07 g of Pt
$CeO_2$ oxide: 70 g
water: an appropriate amount Then, below listed components are mixed to prepare the slurry S6.

(Slurry S6)
the powder H1: 50 g
alumina: 70 g
the powder H3: 70 g
alumina sol: 200 g
water: 50 g In the exhaust gas purifying catalyst 13 of Embodiment 4, the upstream side catalyst coating layer 9 is coated by the slurry S6 produced as above. The downstream side catalyst coating layer 11 is coated by a Pt ammine solution (an amount including 0.93 g of Pt) (hereinafter, referred to as a slurry S7) in place of the slurry 2, after coated by the slurry S6.

In the exhaust gas purifying catalyst 13 of Embodiment 4, the upstream side catalyst coating layer 9 includes precious metals, Rh and Pt, and the weight ratio thereof is 1:0.5. The downstream side catalyst coating layer 11 includes precious metals, Rh and Pt, and the weight ratio thereof is 1:15.5.

Embodiment 5

Although an exhaust gas purifying catalyst 13 in Embodiment 5 is produced basically in the same manner as in Embodiment 3, there are some differences. Accordingly, a description will be made below mainly with respect to the differences.

In Embodiment 5, a slurry S8 as described below is used in place of the slurry S4 as the slurry applied to the internal surface of the entire through hole 3.

The slurry 8 is prepared as below. First, below listed components are mixed, dried at 250° C. for an hour, and calcined at 500° C. for an hour to prepare a powder H4.

(Powder H4)
Pt nitrate solution: an amount containing 0.1 g of Pt
$CeO_2$ oxide: 70 g
water: an appropriate amount Then, below listed components are mixed to prepare the slurry S8.

(Slurry S8)
the powder H1: 50 g
alumina: 70 g
the powder H4: 70 g
alumina sol: 200 g
water: 50 g In Embodiment 5, a Pt ammine solution (an amount including 0.9 g of Pt) (hereinafter, referred to as a slurry S9) is used in place of the slurry S2 as the slurry applied to the internal surface of the area B of the through hole 3 of the substrate 1.

In the exhaust gas purifying catalyst 13 of Embodiment 5, the upstream side catalyst coating layer 9 is coated by the slurry S8 produced as above. The downstream side catalyst coating layer 11 is coated by the slurry S9 after coated by the slurry S8.

In the exhaust gas purifying catalyst 13 of Embodiment 5, the upstream side catalyst coating layer 9 includes precious metals, Rh and Pt, and the weight ratio thereof is 1:0.7. The downstream side catalyst coating layer 11 includes precious metals, Rh and Pt, and the weight ratio thereof is 1:15.0.

Embodiment 6

Although an exhaust gas purifying catalyst 13 in Embodiment 6 is produced basically in the same manner as in Embodiment 1, there are some differences. Accordingly, a description will be made below mainly with respect to the differences.

In Embodiment 6, the area B is set to include the exit end 7 and occupy 3 vol % of the entire volume of the through hole 3. As a result, the area A includes the entrance end 5 and occupies 97 vol % of the entire volume of the through hole 3.

In the exhaust gas purifying catalyst 13 of Embodiment 6, the upstream side catalyst coating layer 9 coated by the slurry 1 includes only a single precious metal, Rh. The downstream side catalyst coating layer 11 coated by the slurry S1 and the slurry S2 includes precious metals, Rh and Pt, and the weight ratio thereof is 1:166.7.

Embodiment 7

Although an exhaust gas purifying catalyst 13 in Embodiment 7 is produced basically in the same manner as in Embodiment 1, there are some differences. Accordingly, a description will now be made mainly with respect to the differences.

In Embodiment 7, the area B is set to include the exit end 7 and occupy 6 vol % of the entire volume of the through hole 3. As a result, the area A includes the entrance end 5 and occupies 94 vol % of the entire volume of the through hole 3.

In the exhaust gas purifying catalyst 13 of Embodiment 7, the upstream side catalyst coating layer 9 coated by the slurry 1 includes only a single precious metal, Rh. The downstream side catalyst coating layer 11 coated by the slurry S1 and the slurry S2 includes precious metals, Rh and Pt, and the weight ratio thereof is 1:83.3.

Embodiment 8

Although an exhaust gas purifying catalyst 13 in Embodiment 8 is produced basically in the same manner as in Embodiment 1, there are some differences. Accordingly, a description will now be made mainly with respect to the differences.

In Embodiment 8, the area B is set to include the exit end 7 and occupy 40 vol % of the entire volume of the through hole 3. As a result, the area A includes the entrance end 5 and occupies 60 vol % of the entire volume of the through hole 3.

In the exhaust gas purifying catalyst 13 of Embodiment 8, the upstream side catalyst coating layer 9 coated by the slurry 1 includes only a single precious metal, Rh. The downstream side catalyst coating layer 11 coated by the slurry S1 and the slurry S2 includes precious metals, Rh and Pt, and the weight ratio thereof is 1:12.5.

Embodiment 9

Although an exhaust gas purifying catalyst 13 in Embodiment 9 is produced basically in the same manner as in Embodiment 1, there are some differences. Accordingly, a description will now be made mainly with respect to the differences.

In Embodiment 9, the area B is set to include the exit end 7 and occupy 60 vol % of the entire volume of the through hole 3. As a result, the area A includes the entrance end 5 and occupies 40 vol % of the entire volume of the through hole 3.

In the exhaust gas purifying catalyst 13 of Embodiment 9, the upstream side catalyst coating layer 9 coated by the slurry 1 includes only a single precious metal, Rh. The downstream side catalyst coating layer 11 coated by the slurry S1 and the slurry S2 includes precious metals, Rh and Pt, and the weight ratio thereof is 1:8.33.

Embodiment 10

Although an exhaust gas purifying catalyst 13 in Embodiment 10 is produced basically in the same manner as in Embodiment 3, there are some differences. Accordingly, a description will now be made mainly with respect to the differences.

In Embodiment 10, a slurry S10 produced as below is used in place of the slurry S4 as the slurry applied to the internal surface of the entire through hole 3.

The slurry S10 is prepared as below. First, below listed components are mixed, dried at 250° C. for an hour, and calcined at 500° C. for an hour to prepare a powder H5.

(Powder H5)
Pd nitrate solution: an amount containing 0.04 g of Pd
$CeO_2$ oxide: 70 g
water: an appropriate amount Then, below listed components are mixed to prepare the slurry S10.

(Slurry S10)
the powder H1: 50 g
alumina: 70 g
the powder H5: 70 g
alumina sol: 200 g
water: 50 g In the exhaust gas purifying catalyst 13 of Embodiment 10, the upstream side catalyst coating layer 9 is coated by the slurry S10 produced as above. The downstream side catalyst coating layer 11 is coated by a Pd ammine solution (an amount including 0.96 g of Pd) (hereinafter, referred to as a slurry S11) after coated by the slurry S10.

In the exhaust gas purifying catalyst 13 of Embodiment 10, the upstream side catalyst coating layer 9 includes precious metals, Rh and Pd, and the weight ratio thereof is 1:0.3. The downstream side catalyst coating layer 11 includes precious metals, Rh and Pd, and the weight ratio thereof is 1:16.0.

Embodiment 11

Although an exhaust gas purifying catalyst 13 in Embodiment 11 is produced basically in the same manner as in Embodiment 4, there are some differences. Accordingly, a description will now be made mainly with respect to the differences.

In Embodiment 11, a slurry S12 produced as below is used in place of the slurry S6 as the slurry applied to the internal surface of the entire through hole 3.

The slurry S12 is prepared as below. First, below listed components are mixed, dried at 250° C. for an hour, and calcined at 500° C. for an hour to prepare a powder H6.

(Powder H6)
Pd nitrate solution: an amount containing 0.07 g of Pd
$CeO_2$ oxide: 70 g
water: an appropriate amount Then, below listed components are mixed to prepare the slurry S12.

(Slurry S12)
the powder H1: 50 g
alumina: 70 g
the powder H6: 70 g
alumina sol: 200 g
water: 50 g In the exhaust gas purifying catalyst 13 of Embodiment 11, the upstream side catalyst coating layer 9 is coated by the slurry S12 produced as above. The downstream side catalyst coating layer 11 is coated by a Pd ammine solution (an amount including 0.93 g of Pd) (hereinafter, referred to as a slurry S13) after coated by the slurry S12.

In the exhaust gas purifying catalyst 13 of Embodiment 11, the upstream side catalyst coating layer 9 includes precious metals, Rh and Pd, and the weight ratio thereof is 1:0.5. The downstream side catalyst coating layer 11 includes precious metals, Rh and Pd, and the weight ratio thereof is 1:15.5.

Embodiment 12

Although an exhaust gas purifying catalyst 13 in Embodiment 12 is produced basically in the same manner as in Embodiment 5, there are some differences. Accordingly, a description will now be made mainly with respect to the differences.

In Embodiment 12, a slurry S14 produced as below is used in place of the slurry S8 as the slurry applied to the internal surface of the entire through hole 3.

The slurry S14 is prepared as below. First, below listed components are mixed, dried at 250° C. for an hour, and calcined at 500° C. for an hour to prepare a powder H7.

(Powder H7)
Pd nitrate solution: an amount containing 0.1 g of Pd
$CeO_2$ oxide: 70 g
water: an appropriate amount Then, below listed components are mixed to prepare the slurry S14.

(Slurry S14)
the powder H1: 50 g
alumina: 70 g
the powder H7: 70 g
alumina sol: 200 g
water: 50 g In Embodiment 12, Pd ammine solution (an amount including 0.9 g of Pd) (hereinafter, referred to as a slurry S15) is used in place of the slurry S9 as the slurry applied to the internal surface of the area B of the through hole 3 of the substrate 1.

In the exhaust gas purifying catalyst 13 of Embodiment 12, the upstream side catalyst coating layer 9 is coated by the slurry S14 produced as above. The downstream side catalyst coating layer 11 is coated by the slurry S15 after coated by the slurry S14.

In the exhaust gas purifying catalyst 13 of Embodiment 12, the upstream side catalyst coating layer 9 includes precious metals, Rh and Pd, and the weight ratio thereof is 1:0.7. The downstream side catalyst coating layer 11 includes precious metals, Rh and Pd, and the weight ratio thereof is 1:15.0.

Embodiment 13

Although an exhaust gas purifying catalyst 13 in Embodiment 13 is produced basically in the same manner as in Embodiment 2, there are some differences. Accordingly, a description will now be made mainly with respect to the differences.

In Embodiment 13, the area B is set to include the exit end 7 and occupy 3 vol % of the entire volume of the through hole 3. As a result, the area A includes the entrance end 5 and occupies 97 vol % of the entire volume of the through hole 3.

In the exhaust gas purifying catalyst 13 of Embodiment 13, the upstream side catalyst coating layer 9 coated by the slurry S1 includes only a single precious metal, Rh. The downstream side catalyst coating layer 11 coated by the slurry S1 and the slurry S3 includes precious metals, Rh and Pd, and the weight ratio thereof is 1:166.7.

Embodiment 14

Although an exhaust gas purifying catalyst 13 in Embodiment 14 is produced basically in the same manner as in Embodiment 2, there are some differences. Accordingly, a description will now be made mainly with respect to the differences.

In Embodiment 14, the area B is set to include the exit end 7 and occupy 6 vol % of the entire volume of the through hole 3. As a result, the area A includes the entrance end 5 and occupies 94 vol % of the entire volume of the through hole 3.

In the exhaust gas purifying catalyst 13 of Embodiment 14, the upstream side catalyst coating layer 9 coated by the slurry S1 includes only a single precious metal, Rh. The downstream side catalyst coating layer 11 coated by the slurry S1 and the slurry S3 includes precious metals, Rh and Pd, and the weight ratio thereof is 1:83.3.

Embodiment 15

Although an exhaust gas purifying catalyst 13 in Embodiment 15 is produced basically in the same manner as in Embodiment 2, there are some differences. Accordingly, a description will now be made mainly with respect to the differences.

In Embodiment 15, the area B is set to include the exit end 7 and occupy 40 vol % of the entire volume of the through hole 3. As a result, the area A includes the entrance end 5 and occupies 60 vol % of the entire volume of the through hole 3.

In the exhaust gas purifying catalyst 13 of Embodiment 15, the upstream side catalyst coating layer 9 coated by the slurry S1 includes only a single precious metal, Rh. The downstream side catalyst coating layer 11 coated by the slurry S1 and the slurry S3 includes precious metals, Rh and Pd, and the weight ratio thereof is 1:12.5.

Embodiment 16

Although an exhaust gas purifying catalyst 13 in Embodiment 16 is produced basically in the same manner as in Embodiment 2, there are some differences. Accordingly, a description will now be made mainly with respect to the differences.

In Embodiment 16, the area B is set to include the exit end 7 and occupy 60 vol % of the entire volume of the through hole 3. As a result, the area A includes the entrance end 5 and occupies 40 vol % of the entire volume of the through hole 3.

In the exhaust gas purifying catalyst 13 of Embodiment 16, the upstream side catalyst coating layer 9 coated by the slurry S1 includes only a single precious metal, Rh. The downstream side catalyst coating layer 11 coated by the slurry S1 and the slurry S3 includes precious metals, Rh and Pd, and the weight ratio thereof is 1:8.33.

Comparative Example 1

First, below listed components are mixed, dried at 250° C. for an hour, and calcined at 500° C. for an hour to prepare a powder H8.
 (Powder H8)
 Pt nitrate solution: an amount containing 1.0 g of Pt
 Ce oxide: 70 g
 water: an appropriate amount
Then, below listed components are mixed to prepare a slurry S16.
 (Slurry S16)
 the powder H1: 50 g
 alumina: 70 g
 the powder H8: 70 g
 alumina sol: 200 g
 water: 50 g The slurry S16 is applied to coat the internal surface of the same through hole 3 of the substrate 1 as in Embodiment 1 from the entrance end 5 to the exit end 7, and dried. After dried at 250° C. for an hour, calcination is performed at 500° C. for an hour to complete an exhaust gas purifying catalyst.

In the exhaust gas purifying catalyst produced in Comparative Example 1, the catalyst coating layer contains 1.0 g of Pt, 0.2 g of Rh, and 120 g of alumina as a whole. The weight ratio of Rh to Pt is 1:5. Accordingly, the exhaust gas purifying catalyst of Comparative Example 1 does not have the area A in which the weight ratio of Rh to Pt is 1:0 to 1:1, and is thus out of the scope of the present invention.

Also, in Comparative Example 1, the amount of Ce and the amount of Zr contained in the catalyst coating layer are 0.4 mol/L, respectively.

Comparative Example 2

First, below listed components are mixed, dried at 250° C. for an hour, and calcined at 500° C. for an hour to prepare a powder H9.
 (Powder H9)
 Pd nitrate solution: an amount containing 1.0 g of Pd
 Ce oxide: 70 g
 water: an appropriate amount
Then, below listed components are mixed to prepare a slurry S17.
 (Slurry S17)
 the powder H1: 50 g
 alumina: 70 g
 the powder H9: 70 g
 alumina sol: 200 g
 water: 50 g The slurry S17 is applied to coat the internal surface of the same through hole 3 of the substrate 1 as in Embodiment 1 from the entrance end 5 to the exit end 7, and dried. After dried at 250° C. for an hour, calcination is performed at 500° C. for an hour to complete an exhaust gas purifying catalyst.

In the exhaust gas purifying catalyst produced in Comparative Example 2, the catalyst coating layer contains 1.0 g of Pd, 0.2 g of Rh, and 120 g of alumina as a whole. The weight ratio of Rh to Pd is 1:5. Accordingly, the exhaust gas purifying catalyst of Comparative Example 2 does not have the area A in which the weight ratio of Rh to Pd is within a range of 1:0 to 1:1, and is thus out of the scope of the present invention.

Also, in Comparative Example 2, the amount of Ce and the amount of Zr contained in the catalyst coating layer are 0.4 mol/L, respectively.

Comparative Example 3

Although an exhaust gas purifying catalyst 13 in Comparative Example 3 is produced basically in the same manner as in Embodiment 3, there are some differences. Accordingly, a description will now be made mainly with respect to the differences.

In Comparative Example 3, a slurry S18 as described below is used in place of the slurry S4 as the slurry applied to the internal surface of the entire through hole 3.

The slurry 18 is prepared as below. First, below listed components are mixed, dried at 250° C. for an hour, and calcined at 500° C. for an hour to prepare a powder H10.
 (Powder H10)
 Pt nitrate solution: an amount containing 0.3 g of Pt
 $CeO_2$ oxide: 70 g
 water: an appropriate amount
Then, below listed components are mixed to prepare the slurry S18.
 (Slurry S18)
 the powder H1: 50 g
 alumina: 70 g
 the powder H10: 70 g
 alumina sol: 200 g
 water: 50 g In the exhaust gas purifying catalyst 13 of Comparative Example 3, the upstream side catalyst coating layer 9 is coated by the slurry S18 produced as above. The downstream side catalyst coating layer 11 is coated by a Pt ammine solution (an amount including 0.7 g of Pt) (hereinafter, referred to as a slurry S19) after coated by the slurry S18.

In the exhaust gas purifying catalyst 13 of Comparative Example 3, the upstream side catalyst coating layer 9 includes precious metals, Rh and Pt, and the weight ratio thereof is 1:2.1. Accordingly, the exhaust gas purifying catalyst 13 produced in Comparative Example 3 is out of the scope of the present invention. Also, the downstream side catalyst coating layer 11 includes precious metals, Rh and Pt, and the weight ratio thereof is 1:11.7.

Comparative Example 4

Although an exhaust gas purifying catalyst 13 in Comparative Example 4 is produced basically in the same manner as in Comparative Example 3, there are some differences. Accordingly, a description will now be made mainly with respect to the differences.

In Comparative Example 4, a slurry S20 as described below is used in place of the slurry S18 as the slurry applied to the internal surface of the entire through hole 3.

The slurry 20 is prepared as below. First, below listed components are mixed, dried at 250° C. for an hour, and calcined at 500° C. for an hour to prepare a powder H11.
(Powder H11)
Pd nitrate solution: an amount containing 0.3 g of Pd
$CeO_2$ oxide: 70 g
water: an appropriate amount
Then, below listed components are mixed to prepare the slurry S20.
(Slurry S20)
the powder H1: 50 g
alumina: 70 g
the powder H11: 70 g
alumina sol: 200 g
water: 50 g In the exhaust gas purifying catalyst of Comparative Example 4, the upstream side catalyst coating layer 9 is coated by the slurry S20 produced as above. The downstream side catalyst coating layer 11 is coated by a Pt ammine solution (an amount including 0.7 g of Pd) (hereinafter, referred to as a slurry S21) after coated by the slurry S20.

In the exhaust gas purifying catalyst 13 of Comparative Example 4, the upstream side catalyst coating layer 9 includes precious metals, Rh and Pd, and the weight ratio thereof is 1:2.1. Accordingly, the exhaust gas purifying catalyst 13 produced in Comparative Example 4 is out of the scope of the present invention. Also, the downstream side catalyst coating layer 11 includes precious metals, Rh and Pd, and the weight ratio thereof is 1:11.7.

An explanation will now be made about an experiment to examine the performance of the exhaust gas purifying catalysts 13 respectively produced according to Embodiments 1 through 16.

(i) Implementation of Durability Test
Each of the exhaust gas purifying catalysts 13 according to Embodiments 1 through 16 and Comparative Examples 1 through 4 was attached to a gasoline engine of 4,000 cc displacement. Then, a 20-hour durability test was conducted at an average engine revolution of 3,500 rpm and at the catalyst's interior temperature of 1,050° C.

Figure 6:
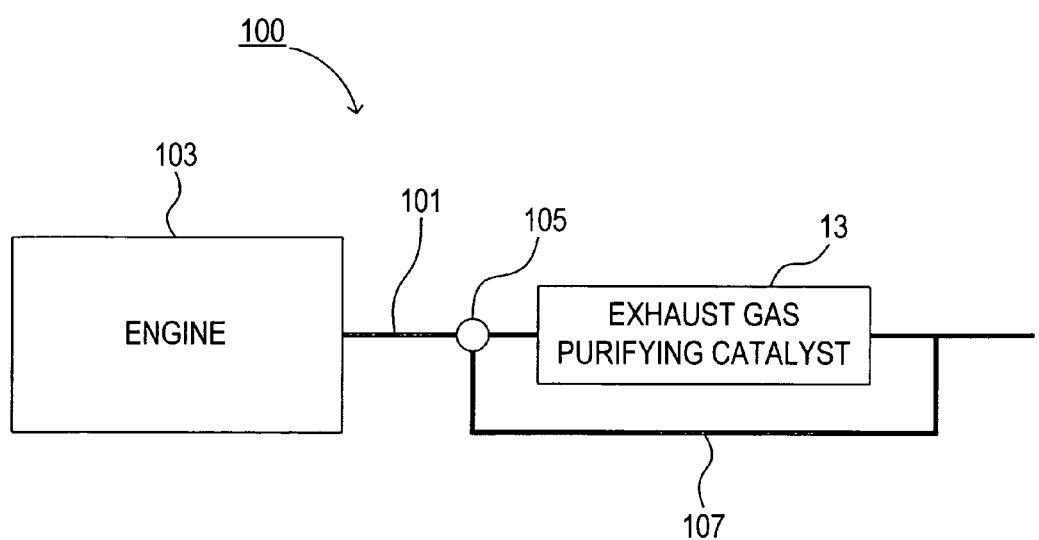
FIG. 6 is an explanatory diagram showing a structure of a testing device 100 used for evaluating warm-up performance.

(ii) Evaluation of Warm-Up Performance
After the aforementioned durability test was completed, the warm-up performance of the exhaust gas purifying catalysts 13 according to Embodiments 1 through 16 and Comparative Examples 1 through 4 was evaluated using a testing device 100 shown in FIG. 6.

The constitution of the testing device 100 is explained. In the testing device 100, the exhaust gas purifying catalyst 13 is attached to a gasoline engine 103 of 3,500 cc displacement via a duct 101. From a switching valve 105 provided in the midstream of the duct 101, a bypass 107 diverges. Accordingly, the switching valve 105 can be used to switch between the exhaust gas purifying catalyst 13 and the bypass 107 as the way to discharge the exhaust gas from the engine 103. Also, in the vicinity of the switching valve 105, a thermometer (not shown) is provided which can measure the temperature of the duct 101.

Now, the method for evaluation of the warm-up performance is explained. The switching valve 105 is initialized in such a way that the exhaust gas from the engine 103 flows into the bypass 107 only. In this state, the temperature of the duct 101 starts to rise. When the measurement value of the thermometer in the vicinity of the switching valve 105 stays at 500° C., the switching valve 105 is switched in such a manner that the exhaust gas from the engine 103 flows into the exhaust gas purifying catalyst 13 only. From this switching point, the time is measured until when the purification rate by the exhaust gas purifying catalyst 13 reaches 50% (HC purification achievement time). The results are shown in Table 1.

TABLE 1

| Sample | Precious metal contained in upstream catalyst coating layer Type | Rh: (Pt or Pd) (weight ratio) | Volume ratio of area B (vol %) | HC 50% purification achievement time (sec) |
|---|---|---|---|---|
| Embodiment 1 | Rh | — | 30 | 24 |
| Embodiment 2 | Rh | — | 30 | 22 |
| Embodiment 3 | Rh, Pt | 1:0.3 | 30 | 23 |
| Embodiment 4 | Rh, Pt | 1:0.5 | 30 | 24 |
| Embodiment 5 | Rh, Pt | 1:0.7 | 30 | 26 |
| Embodiment 6 | Rh | — | 3 | 26 |
| Embodiment 7 | Rh | — | 6 | 24 |
| Embodiment 8 | Rh | — | 40 | 24 |
| Embodiment 9 | Rh | — | 60 | 30 |
| Embodiment 10 | Rh, Pd | 1:0.3 | 30 | 22 |
| Embodiment 11 | Rh, Pd | 1:0.5 | 30 | 22 |
| Embodiment 12 | Rh, Pd | 1:0.7 | 30 | 24 |
| Embodiment 13 | Rh | — | 3 | 24 |
| Embodiment 14 | Rh | — | 6 | 22 |
| Embodiment 15 | Rh | — | 40 | 22 |
| Embodiment 16 | Rh | — | 60 | 28 |
| Comparative Example 1 | Rh, Pt* | 1:5* | — | 35 |
| Comparative Example 2 | Rh, Pd* | 1:5* | — | 33 |
| Comparative Example 3 | Rh, Pt | 1:2.1 | 30 | 33 |
| Comparative Example 4 | Rh, Pd | 1:2.1 | 30 | 28 |

*Description for Comparative Examples 1 and 2 concerns the whole catalyst coating layer.

As shown in Table 1, the HC purification achievement time of the exhaust gas purifying catalysts 13 according to Embodiments 1 through 16 was very short even after the aforementioned durability test was conducted. Conceivably, this is because alloying of Rh and Pt or Pd is restrained.

Figure 2:
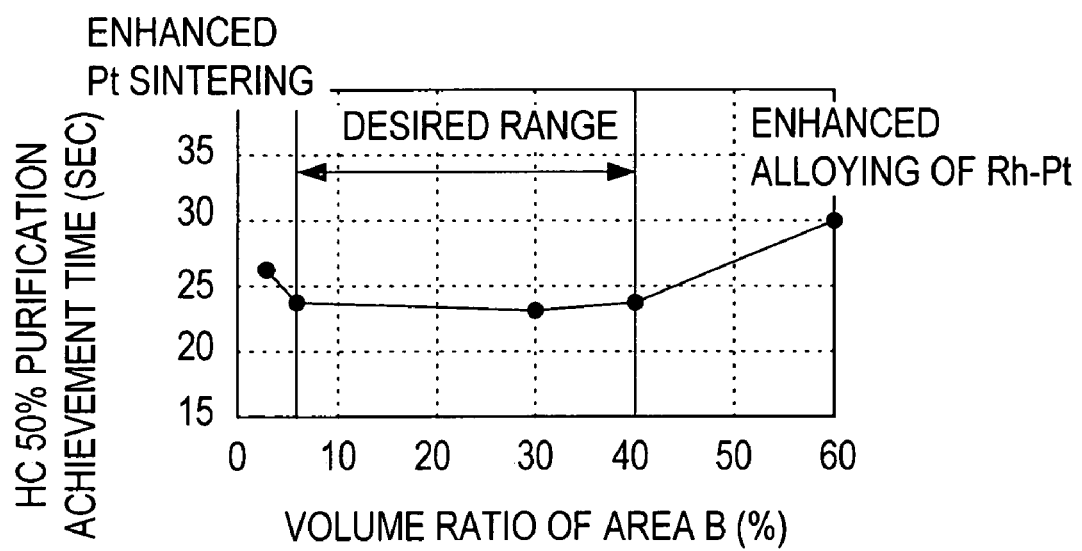
FIG. 2 is a graph showing a correlation between a volume ratio of an area B to the entire volume of a through hole and the HC purification achieving time.

In the exhaust gas purifying catalysts 13 according to Embodiments 1 through 5, 7, and 8, the volume ratio of the area B is within a range of 6 to 40 vol % of the entire volume of the through hole 3 (i.e., the volume ratio of the area A is within a range of 60 to 94 vol %). Accordingly, the HC purification achievement time of these exhaust gas purifying catalysts 13 is still shorter than the HC purification achievement time of the exhaust gas purifying catalysts 13 according to Embodiments 6 and 9 in which the volume ratio of the area B is out of the range. FIG. 2 shows a correlation between the volume ratio of the area B to the entire volume of the through hole 3 and the HC purification achievement time with respect to Embodiments 1, and 6 through 9. As is clear from FIG. 2, the HC purification achievement time of the exhaust gas purifying catalysts 13 in which the volume ratio of the area B is within a range of 6 to 40 vol % (i.e., the volume ratio of the area A is within a range of 60 to 94 vol %) is shorter than the exhaust gas purifying catalysts 13 in which the volume ratio of the area B is out of the range.

Figure 3:
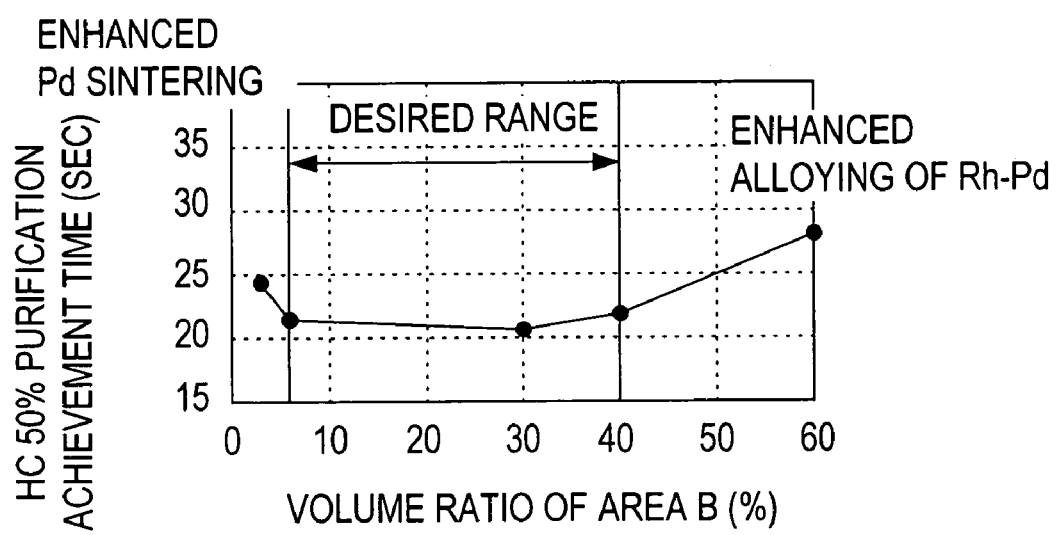
FIG. 3 is a graph showing a correlation between a volume ratio of an area B to the entire volume of a through hole and the HC purification achieving time.

Also in the exhaust gas purifying catalysts 13 according to Embodiments 2, 10 through 12, 14, and 15, the volume ratio of the area B is within a range of 6 to 40 vol % of the entire volume of the through hole 3 (i.e., the volume ratio of the area A is within a range of 60 to 94 vol %). Accordingly, the HC purification achievement time of these exhaust gas purifying catalysts 13 is still shorter than the HC purification achievement time of the exhaust gas purifying catalysts 13 according to Embodiments 13 and 16 in which the volume ratio of the area B is out of the range. FIG. 3 shows a correlation between the volume ratio of the area B to the entire volume of the through hole 3 and the HC purification achievement time, with respect to Embodiments 2, and 13 through 16. As is clear from FIG. 3, the HC purification achievement time of the exhaust gas purifying catalysts 13 in which the volume ratio of the area B is within a range of 6 to 40 vol % (i.e., the volume ratio of the area A is within a range of 60 to 94 vol %) is shorter than the exhaust gas purifying catalysts 13 in which the volume ratio of the area B is out of the range.

The reason for the above results is contemplated as follows. If the volume of the portion corresponding to the area A is not more than 94 vol %, at least 6 vol % of the area B can be secured. The density of Pt and Pd existing in the area B is not increased too high. Therefore, grain growth (sintering) of Pt and Pd can be inhibited. In addition, if the volume of the portion corresponding to the area A is not less than 60 vol %, the area A is broadened and alloying of Rh and Pt or Pd can be further inhibited.

In contrast, in Comparative Example 1, the catalyst coating layer is not divided into the area A and area B. The weight ratio of Rh to Pt is 1:5 (which is out of the range of 1:0 to 1:1). Accordingly, during the durability test, alloying of Rh and Pt occurs, and thus the HC purification achievement time is much lengthened.

In Comparative Example 2, the catalyst coating layer is not divided into the area A and area B. The weight ratio of Rh to Pd is 1:5 (which is out of the range of 1:0 to 1:1). Accordingly, during the durability test, alloying of Rh and Pd occurs, and thus the HC purification achievement time is much lengthened.

In Comparative Example 3, the weight ratio of Rh to Pt is 1:2.1 (which is out of the range of 1:0 to 1:1) in the upstream catalyst coating layer 9 formed in the area A. Accordingly, during the durability test, alloying of Rh and Pt occurs, and thus the HC purification achievement time is much lengthened.

In Comparative Example 4, the weight ratio of Rh to Pd is 1:2.1 (which is out of the range of 1:0 to 1:1) in the upstream catalyst coating layer 9 formed in the area A. Accordingly, during the durability test, alloying of Rh and Pd occurs, and thus the HC purification achievement time is much lengthened.

Figure 4:
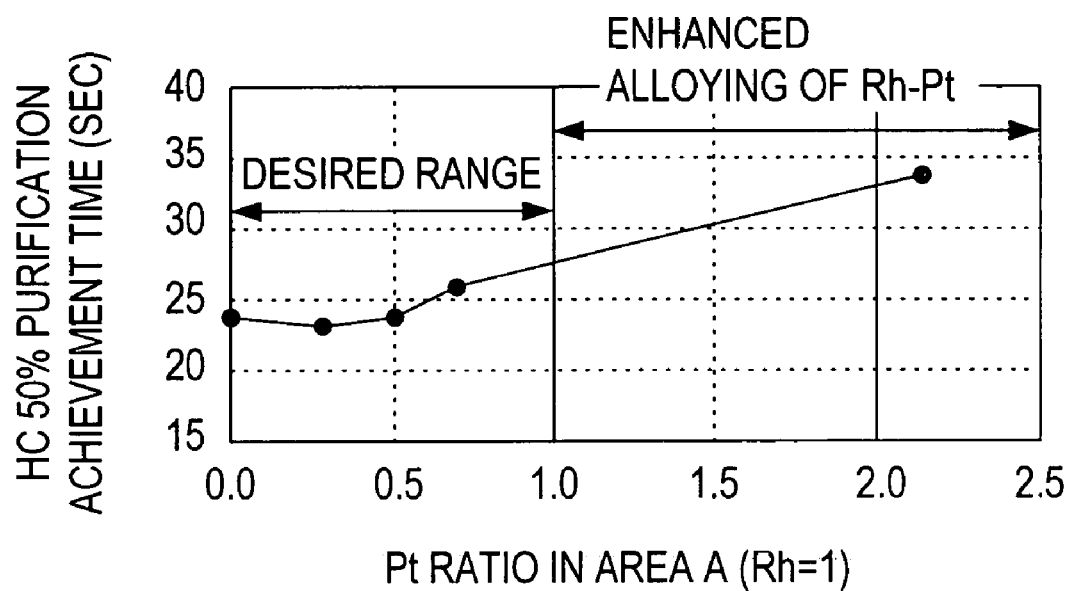
FIG. 4 is a graph showing a correlation between a weight ratio of Pt (weight of Rh=1) contained in an upstream catalyst coating layer 9 formed in an area A and the HC purification achieving time.

FIG. 4 shows a correlation between the weight ratio of Pt (when the weight of Rh is equal to 1) contained in the upstream catalyst coating layer 9 formed in the area A and the HC purification achievement time, with respect to Embodiments 1, 3, 4, 5 and Comparative Example 3. As is clear from FIG. 4, the HC purification achievement time of the exhaust gas purifying catalysts 13 in which the weight ratio of Pt is not more than 1 is shorter than the exhaust gas purifying catalysts 13 in which the weight ratio of Pt is more than 1. This is because if the weight ratio of Pt is not more than 1, alloying of Rh and Pt is least likely to occur even if the durability test is performed.

Figure 5:
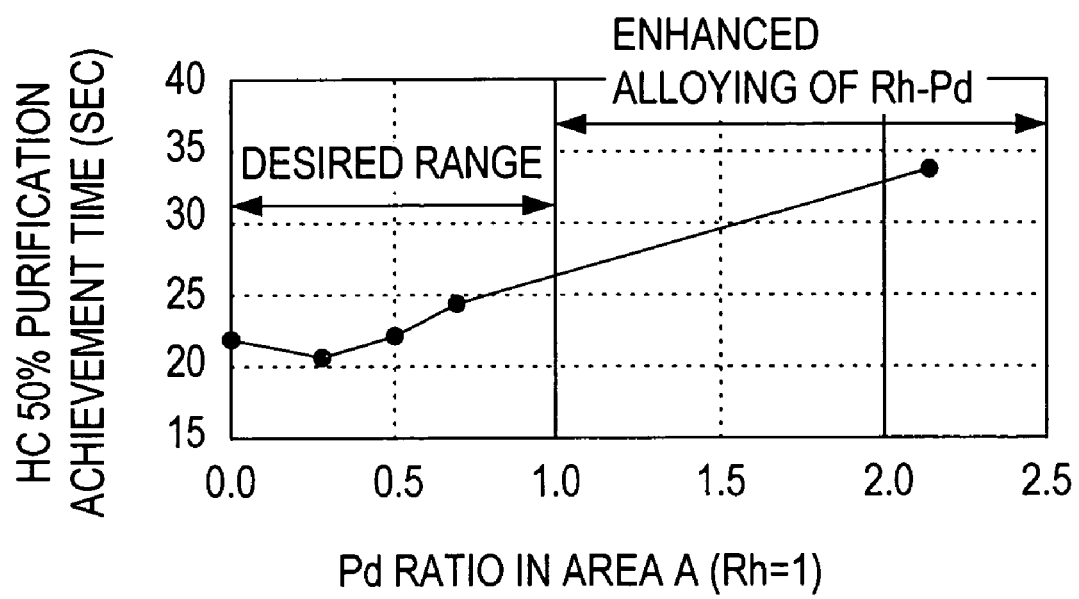
FIG. 5 is a graph showing a correlation between a weight ratio of Pd (weight of Rh=1) contained in an upstream catalyst coating layer 9 formed in an area A and the HC purification achieving time.

FIG. 5 shows a correlation between the weight ratio of Pd (when the weight of Rh is equal to 1) contained in the upstream catalyst coating layer 9 formed in the area A and the HC purification achievement time, with respect to Embodiments 2, 10, 11, 12 and Comparative Example 4. As is clear from FIG. 5, the HC purification achievement time of the exhaust gas purifying catalysts 13 in which the weight ratio of Pd is not more than 1 is shorter than the exhaust gas purifying catalysts 13 in which the weight ratio of Pd is more than 1. This is because if the weight ratio of Pd is not more than 1, alloying of Rh and Pd is least likely to occur even if the durability test is performed.

It is to be understood that the present invention should not be limited to the above described embodiments, but may be practiced in various forms within the scope not departing from the gist of the present invention.

For example, the precious metal, other than Rh, carried by the upstream catalyst coating layer 9 or the downstream catalyst coating layer 11 in Embodiments 1 through 16 may not be limited to Pt or Pd, and may be a combination of Pt and Pd.

Also, the exhaust gas purifying catalysts 13 according to Embodiments 1 through 16 may be produced by coating the substrate 1 with a refractory inorganic oxide (alumina, Zr oxide, Ce oxide, ZrCe compound oxide) and subsequently soaking the coated substrate 1 in a slurry containing a precious metal (Pt, Rh).

What is claimed is:

1. An exhaust gas purifying catalyst comprising:
a single substrate having a through hole penetrating the substrate in an axial direction; and
a catalyst coating layer formed on an internal surface of the through hole, the catalyst coating layer containing:
a component (a): Rh;
a component (b): either Pd or Pt;
a component (c): a refractory inorganic oxide, and
a barium element and a lanthanum element within a range of 0 to 30 g/liter of the catalyst,
wherein the through hole forms a passage for exhaust gas, and the single substrate is divided into an upstream portion of the passage and a downstream portion of the passage with respect to a direction of flow of exhaust gas,
wherein a weight ratio of the component (a) to the component (b) in the catalyst coating layer is within a range of 1:8.33 to 1:166.7 in an area B located on a downstream portion of the passage; and
the weight ratio of the component (a) to the component (b) in the catalyst coating layer is within a range of 1:0.3 to 1:0.7 in the area A located on the upstream portion of the passage and
the upstream portion of the passage being free of barium.

2. An exhaust gas purifying catalyst comprising:
a single substrate having a through hole penetrating the substrate in an axial direction; and
a catalyst coating layer formed on an internal surface of the through hole, the catalyst coating layer containing:
a component (a): Rh;
a component (b): either Pd or Pt;
a component (c): a refractory inorganic oxide, and
a barium element and a lanthanum element within a range of 0 to 30 g/liter of the catalyst,
wherein the through hole forms a passage for exhaust gas, and the catalyst coating layer is divided into an upstream portion and a downstream portion with respect to a direction of flow of exhaust gas,
wherein a volume of a portion of the passage corresponding to the upstream portion is within a range of 60 to 94 vol % of a volume of the whole passage,
and a weight ratio of the component (a) to the component (b) in the catalyst coating layer is within a range of 1:8.33 to 1:166.7 in the downstream portion with respect to the flow direction of exhaust gas;
the weight ratio of the component (a) to the component (b) in the catalyst coating layer is within a range of 1:0.3 to 1:0.7 in the area A located on the upstream portion of the passage and
the upstream portion of the passage being free of barium.

3. An exhaust gas purifying catalyst comprising:
a substrate having a through hole penetrating the substrate in an axial direction from an inlet to an outlet of the through hole; and
a single catalyst coating layer formed on an internal surface of the through hole, the single catalyst coating layer extending continuously from the inlet to the outlet of the through hole and containing:
a component of Rh,
  a component of either Pd or Pt,
  a component of a refractory inorganic oxide within a range of 100 to 300 grams per liter of the catalyst, and
  a barium element and a lanthanum element within a range of 0 to 30 grams per liter of the catalyst,
the through hole forming a passage for a flow of exhaust gas, the through hole extends from the inlet to the outlet and has a first portion and a second portion sequentially arranged after the first portion without any interruption in the single catalyst coating layer between the first portion and the second portion, the first portion of the through hole, with respect to a direction of the flow of exhaust gas is located upstream from the second portion of the through hole,
a volume of the first portion of the through hole is within a range of 60 to 94 vol % of a volume of an entirety of the through hole,
a weight ratio of the component of Rh to the component of either Pt or Pd in the catalyst coating layer is within a range of 1:8.33 to 1:166.7 in the second portion of the through hole to at least reduce alloying of the component of Rh and the component of either Pt or Pd therein at catalyst temperatures of up to 1050° C.; and
the weight ratio of the Rh component to the component Pd in the catalyst coating layer is within a range of 1:0.3 to 1:0.7 in the first portion of the through hole to at least reduce alloying of the Rh component and the Pd component therein at catalyst temperatures of up to 1050° C. and wherein the upstream portion of the passage being free of barium.

* * * * *